Nov. 27, 1928.

H. S. HUMPHREY

WATER HEATER

Filed Feb. 3, 1923

1,692,839

INVENTOR
Herbert S. Humphrey
BY Chappell & Earl
ATTORNEYS

Patented Nov. 27, 1928.

1,692,839

UNITED STATES PATENT OFFICE.

HERBERT S. HUMPHREY, OF KALAMAZOO, MICHIGAN, ASSIGNOR TO RUUD MANUFACTURING COMPANY, OF PITTSBURGH, PENNSYLVANIA.

WATER HEATER.

Application filed February 3, 1928. Serial No. 251,584.

The main objects of this invention are:

First, to provide in a water heater an improved casing bottom and burner mounting unit.

Second, to provide in a water heater an improved secondary air valve structure.

Objects pertaining to details and economies of my invention will definitely appear from the description to follow. The invention is defined in the claims.

A structure embodying the features of my invention is clearly illustrated in the accompanying drawing, in which.

Figure 1:
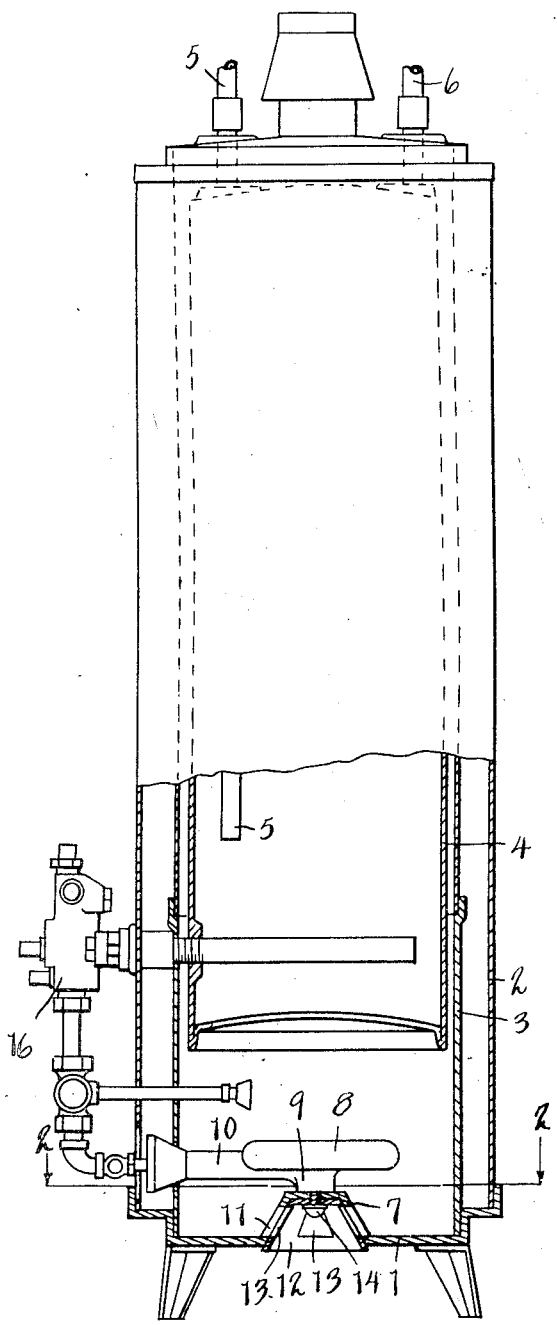
Fig. 1 is a detail side elevation of a water heater embodying the features of my invention partially in section on line 1—1 of Fig. 2.
Figure 2:
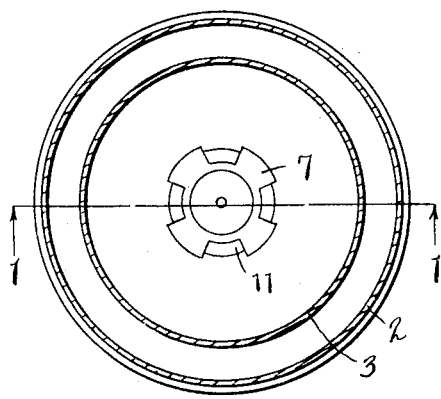
Fig. 2 is a horizontal section on line 2—2 of Fig. 1.
Figure 3:
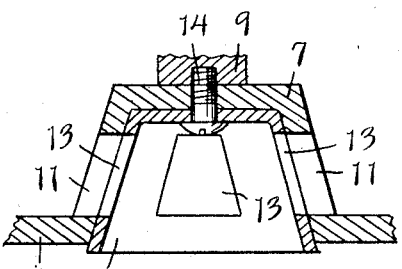
Fig. 3 is an enlarged detail view in section on a line corresponding to that of Fig. 1.

Referring to the drawing, the casing of my improved water heater comprises a bottom designated generally by the numeral 1 shouldered to receive and support the outer and inner casing walls 2 and 3. Supported within the casing is a water reservoir 4 having inlet and discharge connections 5 and 6.

The bottom 1 is provided with a raised central conical portion 7 preferably formed integrally therewith, the bottom being a casting. This provides a support for the burner 8 which has a base 9 resting upon the support and a laterally projecting Bunson tube 10. The burner is shown mainly in conventional form. This raised portion 7 has secondary air inlet openings 11 in the side walls thereof. These openings are controlled by a conical valve 12 having ports 13 therein adapted to be brought into register with the openings 11.

This valve is rotatably supported by the screw 14 which in the embodiment illustrated also serves as the securing means for the burner 8, the screw being threaded into the base 9 of the burner.

A thermostat mechanism 16 provides automatic control but as these details form no part of my present invention they are not further described herein.

By forming the bottom as described or providing the same with the raised burner support with the air inlet openings therein, the secondary air is very effectively distributed to the burner and a simple valve mechanism is provided which is fully protected and not likely to be disarranged.

The structure is very economical and durable.

Having thus described my invention what I claim as new and desire to secure by Letters Patent is:

1. In a water heater, the combination of a casing provided with a bottom having a raised conical central portion with side air openings therein, a burner seated on said raised portion and having a laterally extending Bunson tube, a conical air inlet valve seating within said conical raised portion of said bottom and having ports adapted to be brought into register with the air inlet openings of said raised portion, and an attaching screw for said burner constituting a supporting pivot for said valve.

2. In a water heater, the combination of a water heater casing, a water reservoir within said casing, a bottom for said casing having a central conical burner supporting portion provided with secondary air inlet openings in the side walls thereof, a burner mounted upon said support, and a conical valve rotatably mounted within said raised portion of said bottom and provided with ports adapted to be brought into register therewith.

3. In a water heater, the combination of a casing provided with a bottom having a raised conical central portion with side air openings therein, a burner seated on said raised portion and having a laterally extending Bunson tube, and a conical air inlet valve rotatably mounted within said conical raised portion of said bottom and having ports adapted to be brought into register with the air inlet openings of said raised portion.

4. In a water heater, the combination of a casing provided with a bottom having a raised centrally disposed burner support with air openings therein, said bottom being open below said support, and a valve for said air inlet openings mounted within said burner support.

5. In a water heater, the combination of a casing provided with a bottom having a centrally disposed burner support with side air openings therein, said bottom being open below said support, and a valve for said air inlet openings mounted within said burner support.

In witness whereof I have hereunto set my hand.

HERBERT S. HUMPHREY.